(12) United States Patent
Tanaka et al.

(10) Patent No.: US 7,495,692 B2
(45) Date of Patent: Feb. 24, 2009

(54) IMAGE PROCESSING DEVICE AND ELECTRONIC CAMERA

(75) Inventors: Yoshinobu Tanaka, Hachioji (JP); Akira Ueno, Akiruno (JP); Takashi Yanada, Inagi (JP)

(73) Assignee: Olympus Corporation, Tokyo (JP)

( * ) Notice: Subject to any disclaimer, the term of this patent is extended or adjusted under 35 U.S.C. 154(b) by 676 days.

(21) Appl. No.: 11/247,551

(22) Filed: Oct. 11, 2005

(65) Prior Publication Data
US 2006/0077261 A1 Apr. 13, 2006

(30) Foreign Application Priority Data
Oct. 13, 2004 (JP) ............................. 2004-299198

(51) Int. Cl.
*H04N 5/228* (2006.01)

(52) U.S. Cl. ........................... 348/208.4; 348/208.12; 348/231.3; 348/352

(58) Field of Classification Search .............. 348/208.4, 348/208.12, 221.1, 222.1, 231.3, 352, 362
See application file for complete search history.

(56) References Cited

FOREIGN PATENT DOCUMENTS

JP 06-046311 2/1994

*Primary Examiner*—Lin Ye
*Assistant Examiner*—Gevell Selby
(74) *Attorney, Agent, or Firm*—Straub and Pokotylo; John C. Pokotylo

(57) ABSTRACT

In an image processing device such as an electronic camera having a detecting section which detects blurring of an image (movement of the image) picked up by an imaging element, a part of evaluation or calculation required for controls (AF, AE, AWB, etc.) is performed in parallel with the detection of the blurring of the image in order to speed up the controls. After completing the detection of the image blurring, an influence of the blurring is corrected to perform final calculation. In this case, an image area as a calculation object can be limited to raise a processing efficiency.

18 Claims, 15 Drawing Sheets

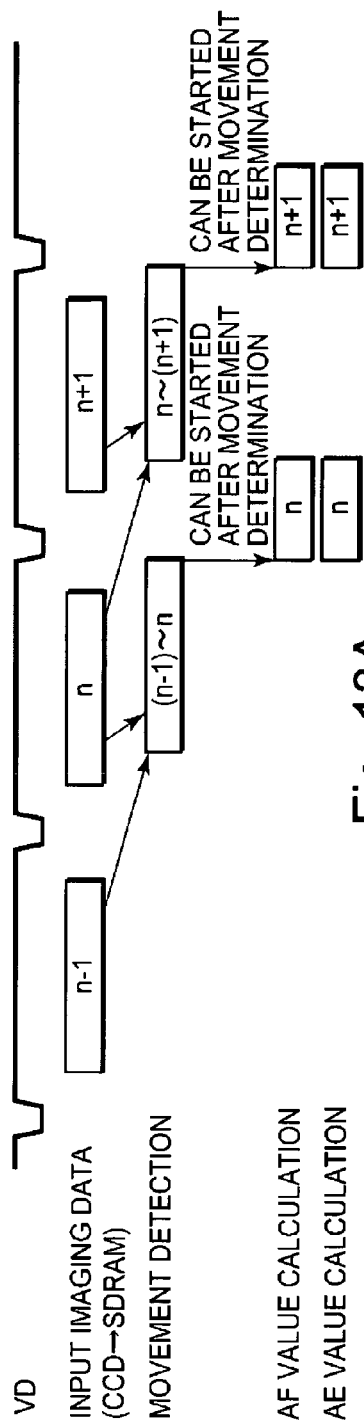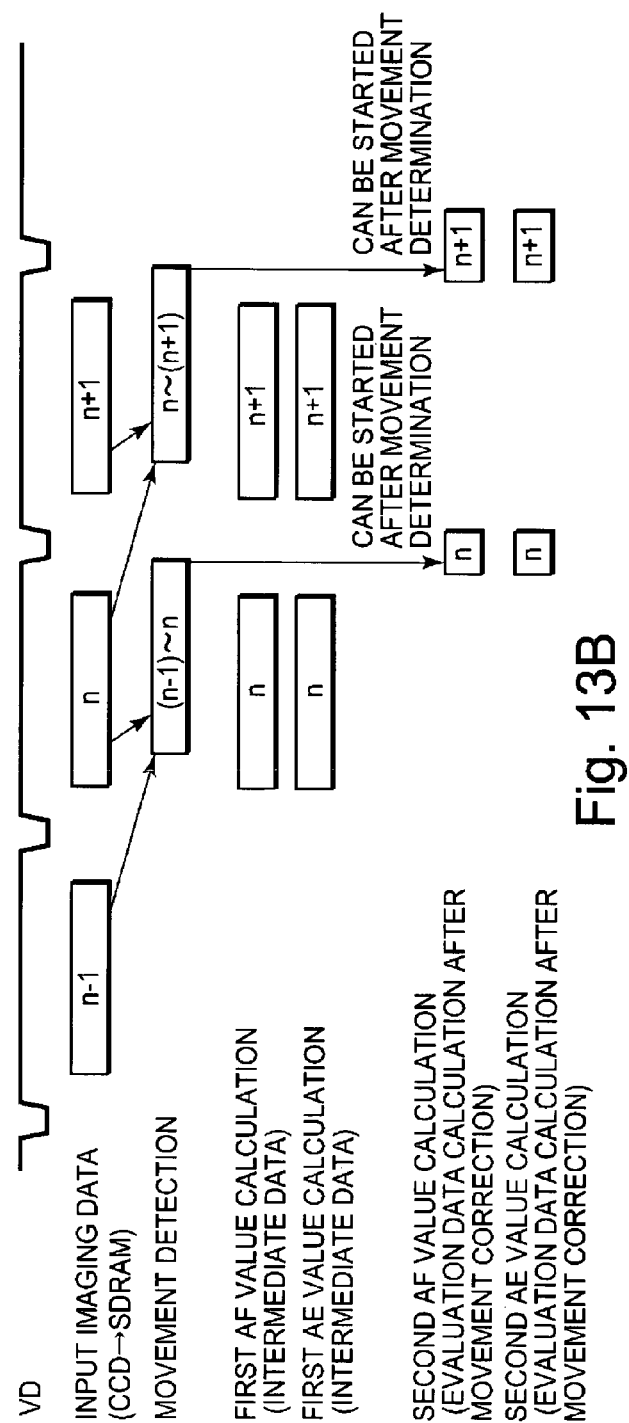

IMAGE PROCESSING DEVICE AND ELECTRONIC CAMERA

CROSS-REFERENCE TO RELATED APPLICATION

This application is based upon and claims the benefit of priority from prior Japanese Patent Application No. 2004-299198, filed Oct. 13, 2004, the entire contents of which are incorporated herein by reference.

BACKGROUND OF THE INVENTION

1. Field of the Invention

The present invention relates to an image processing device and an electronic camera, more particularly to an image processing device and an electronic camera having a function such as vibration correction which detects a movement amount of an image.

2. Description of the Related Art

There have been proposed various electronic cameras having a so-called electronic vibration correcting function for correcting blurring of an image generated by hands movement or the like by use of the image obtained as digital data. In electronic vibration correction, a little broader image is acquired beforehand in consideration of movement of the image by the hands movement. After detecting a movement amount of the image by the hands movement, the camera controls in such a manner that a part of the acquired little broader image is cut out (extracted) and read out. By this control, the image of which the vibration is corrected is obtained.

Moreover, for example, in Japanese Patent Application Publication No. 06-46311, there has been proposed a camera which performs an auto focus (AF) calculation, an auto exposure (AE) calculation, or an auto white balance (AWB) calculation at an occurrence of camera shake by the method of the above-described electronic vibration correcting function.

In general, in a case where AF is performed utilizing a digital image, after AD-converting an analog imaging signal obtained with an imaging element, a signal of a predetermined frequency component preferable for performing AF detection is extracted. Moreover, this extracted signal is digitally and cumulatively added up to obtain AF evaluation data, and a calculating section such as a CPU performs a predetermined calculation based on this AF evaluation data to perform known focus detection and focus control.

Here, in Japanese Patent Application Publication No. 06-46311, a little broader image is acquired beforehand in the same manner as in the electronic vibration correction. At the occurrence of hands movement, as shown in FIGS. 15A to 15C, a camera controls in such a manner that an area 101 which position is adjusted according to the hands movement amount is cut out and read out from a part of the little broader image acquired beforehand. Moreover, the data in the read area 101 is cumulatively added up to obtain the AF evaluation data. According to such a method, the AF can be performed based on the data after the vibration correction.

Moreover, in the example of FIGS. 15A to 15C, the cumulative addition is performed in one area, but may be performed with respect to a plurality of areas. In this case, for example, as shown in FIGS. 16A to 16C, the area 101 is further divided into a plurality of blocks 101a, and the cumulative addition is performed for each divided block.

Furthermore, in the AE or AWB, after changing the position of the area 101 from which the image is to be cut out in response to the movement of the image, the cumulative addition is performed for each color component.

However, in the method of Japanese Patent Application Publication No. 06-46311, no processing is performed concerning an AF control, an AE control, and an AWB control until the movement amount of the image is detected. Therefore, in the method of Japanese Patent Application Publication No. 06-46311, a processing time of the AF control, the AE control, or the AWB control at the occurrence of the hands movement is delayed as much as a time for movement amount detection.

The present invention has been made in view of the above-described situation, and an object is to provide an image processing device capable of performing a control such as the AF, AE, or AWB control at a higher speed, even in a case where the hands movement is occurred, and an electronic camera on which such an image processing device is mounted.

BRIEF SUMMARY OF THE INVENTION

According to the present invention, there is provided an image processing device comprising a detecting section (detection unit, detection circuit or the like) which detects blurring of an image (movement of the image) picked up by an imaging element, wherein evaluation data of the picked-up image is calculated (simplified calculation) to obtain an intermediate value (simplified evaluation data) in parallel with a detecting operation of the detecting section, and the result is recorded in a memory. Moreover, after completion of the detection with the detection unit, a final value of the evaluation data is calculated (final calculation) from the intermediate value of the evaluation data recorded in the memory based on the blurring detected by the detecting section. Since a series of calculation is divided into two before and after the detection of the blurring of the image, a calculation time after the detection of the blurring of the image can be shortened.

Examples of the evaluation data of the image include the evaluation data for use in an AF control, an AE control, an AWB control and the like. For example, in the final calculation, an area can be cut out from the picked-up image to correct an influence of the blurring, and as the evaluation data across the cut our area used for the above described controls, luminance or color information can be calculated. In this case, the area to be cut out from the image is determined based on the blurring detected by the detecting section, and only this cutout area can be regarded as a calculation object. Furthermore, the intermediate values of the evaluation data in the cutout areas in a plurality of images can be accumulated to get the final value of the evaluation data. Furthermore, by integrating a predetermined number of data into one data in this accumulation, the data amount can be reduced.

Moreover, even in the simplified calculation, the calculation can be performed with respect to an only part of the image picked-up by an imaging device as the calculation object. In this case, the data amount to be calculated can also be reduced. Moreover, in the final calculation, the area can be further cut out from the part of the image based on blurring detected thereafter. In this case, the data as the calculation object can be reduced further more.

Obviously, even in the simplified calculation, the predetermined number of data can be integrated into one to reduce the data amount.

For example, the present invention can be understood as an image processing device or an electronic camera comprising: an input section which inputs imaging data obtained by image capturing; a simplified evaluation data converting section which converts the imaging data input by the input section into simplified evaluation data; a storage section which stores the simplified evaluation data converted by the simplified evaluation data converting section; a movement detecting section which detects movement of an image from the imaging data input by the input section at a previous imaging time and the imaging data input by the input section at a present imaging time; and a final evaluation data converting section which converts the simplified evaluation data stored in the storage section into final evaluation data in response to the image movement detected by the movement detecting section.

According to the present invention, the imaging data is once converted into the simplified evaluation data, and therefore a control such as the AF control, the AE control and the AWB control can be speeded up.

According to the present invention, there can be provided an image processing device capable of executing controls such as the AF control, the AE control, and the AWB control at a higher speed even in a case where hands blurring is occurred, and an electronic camera on which such an image processing device is mounted.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 13A is a timing chart at a time of conventional AF and AE calculations;

FIG. 13B is a timing chart at the time of the AF and AE calculations in the electronic camera with the image processing device according to one embodiment of the present invention;

DETAILED DESCRIPTION OF THE PREFERRED EMBODIMENTS

Preferred embodiments of the invention are described below with reference to the accompanying drawings.

Figure 1:
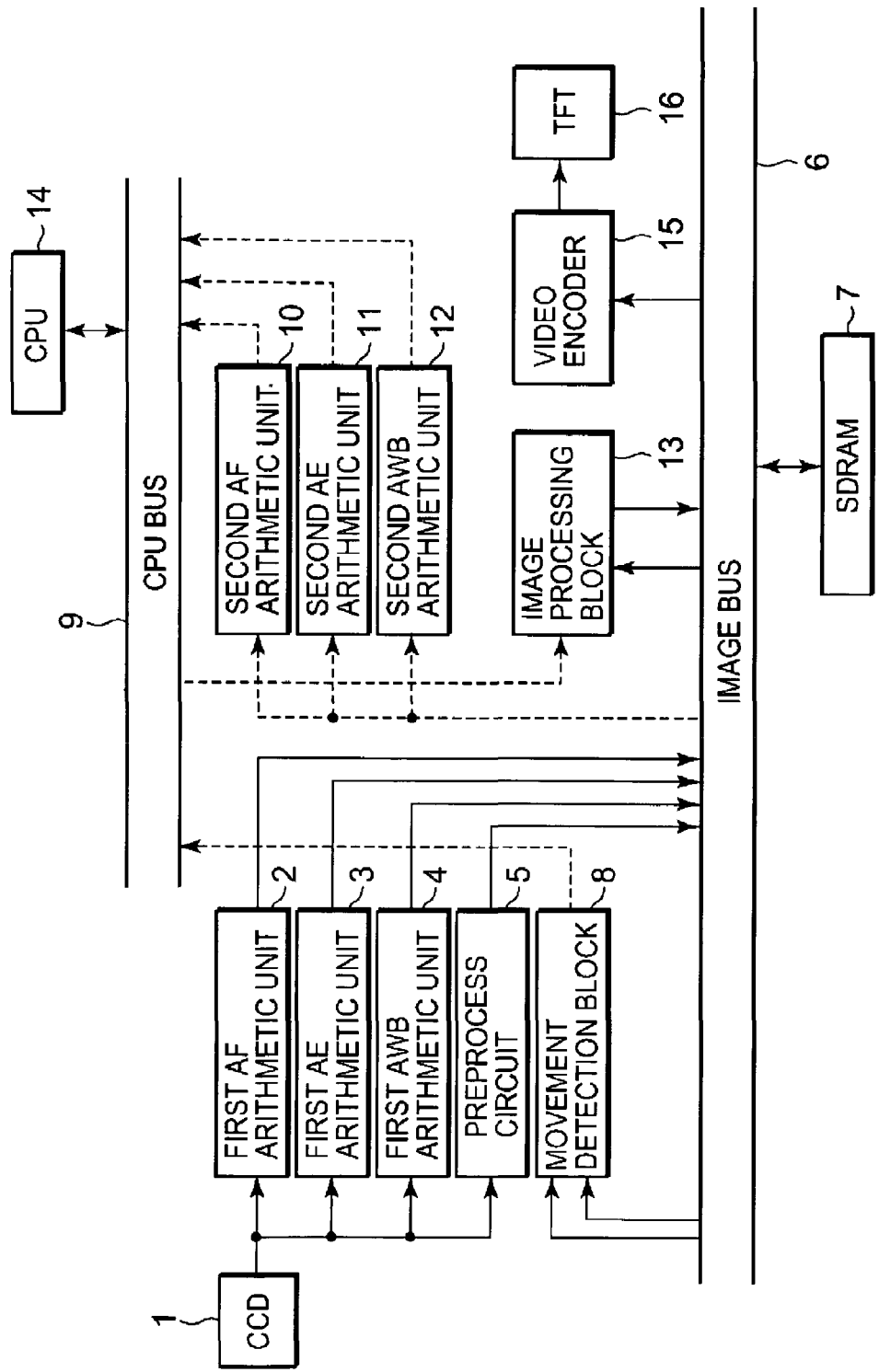
FIG. 1 is a circuit constitution diagram of an electronic camera with an image processing device according to an embodiment of the present invention.

FIG. 1 is a circuit constitution diagram of an electronic camera on which an image processing device is mounted according to an embodiment of the present invention. That is, the electronic camera of FIG. 1 has: an imaging element (CCD) 1; a first auto focus (AF) arithmetic unit 2; a first auto exposure (AE) arithmetic unit 3; a first auto white balance (AWB) arithmetic unit 4; a preprocess circuit 5; an image bus 6 (which transmits image data); a synchronous DRAM (SDRAM) 7; and a movement detection block 8. The electronic camera further has: a CPU bus 9; a second AF arithmetic unit 10; a second AE arithmetic unit 11; a second AWB arithmetic unit 12; an image processing block 13; a CPU 14; a video encoder 15; and a thin film transistor (TFT) display unit 16. These constitutions may be configured into one chip or several separate units.

An operation of the electronic camera constituted as shown in FIG. 1 will be described hereinafter in accordance with a flow of processing data.

A luminous flux from a subject (not shown) which has entered via an optical photographing system (not shown) is formed into an image on the CCD 1 as an input member and an imaging member. The CCD 1 converts the subject luminous flux into an analog imaging signal by photoelectric conversion, and an AD converter (not shown) further converts the imaging signal into digital imaging data.

Figure 2:
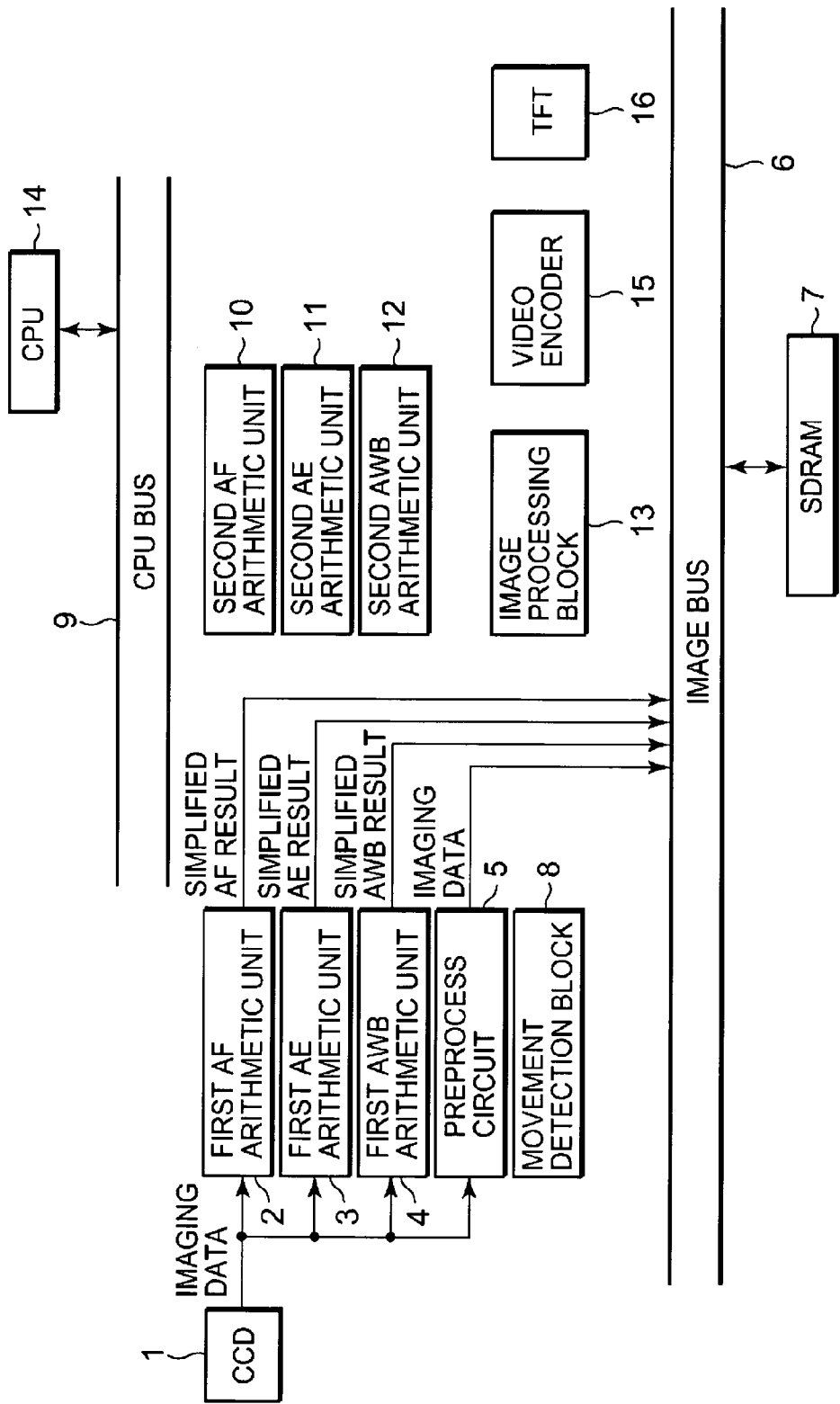
FIG. 2 is a first diagram showing a flow of data in the electronic camera with the image processing device according to the embodiment of the present invention.

FIG. 2 shows a flow of the imaging data obtained by the CCD 1. The imaging data are output to the first AF arithmetic unit 2, the first AE arithmetic unit 3, and the first AWB arithmetic unit 4 as simplified evaluation data conversion portions, and are also output to the preprocess circuit 5.

The first AF arithmetic unit 2 extracts luminance (Y) data from the input imaging data, and cumulatively adds up the extracted Y data to obtain simplified AF evaluation data. The first AE arithmetic unit 3 cumulatively adds up the input imaging data for each color component to obtain simplified AE evaluation data. The first AWB arithmetic unit 4 cumulatively adds up the input imaging data for each color component to obtain simplified AWB evaluation data. These simplified evaluation data are sent to the image bus 6 as shown in FIG. 2, and thereafter stored in the SDRAM 7 as a storage section (memory).

Moreover, the preprocess circuit 5 subjects the input imaging data to preprocesses such as noise removal and signal amplification and sends the preprocessed imaging data to the image bus 6. This preprocessed imaging data is stored in the SDRAM 7.

Figure 3:
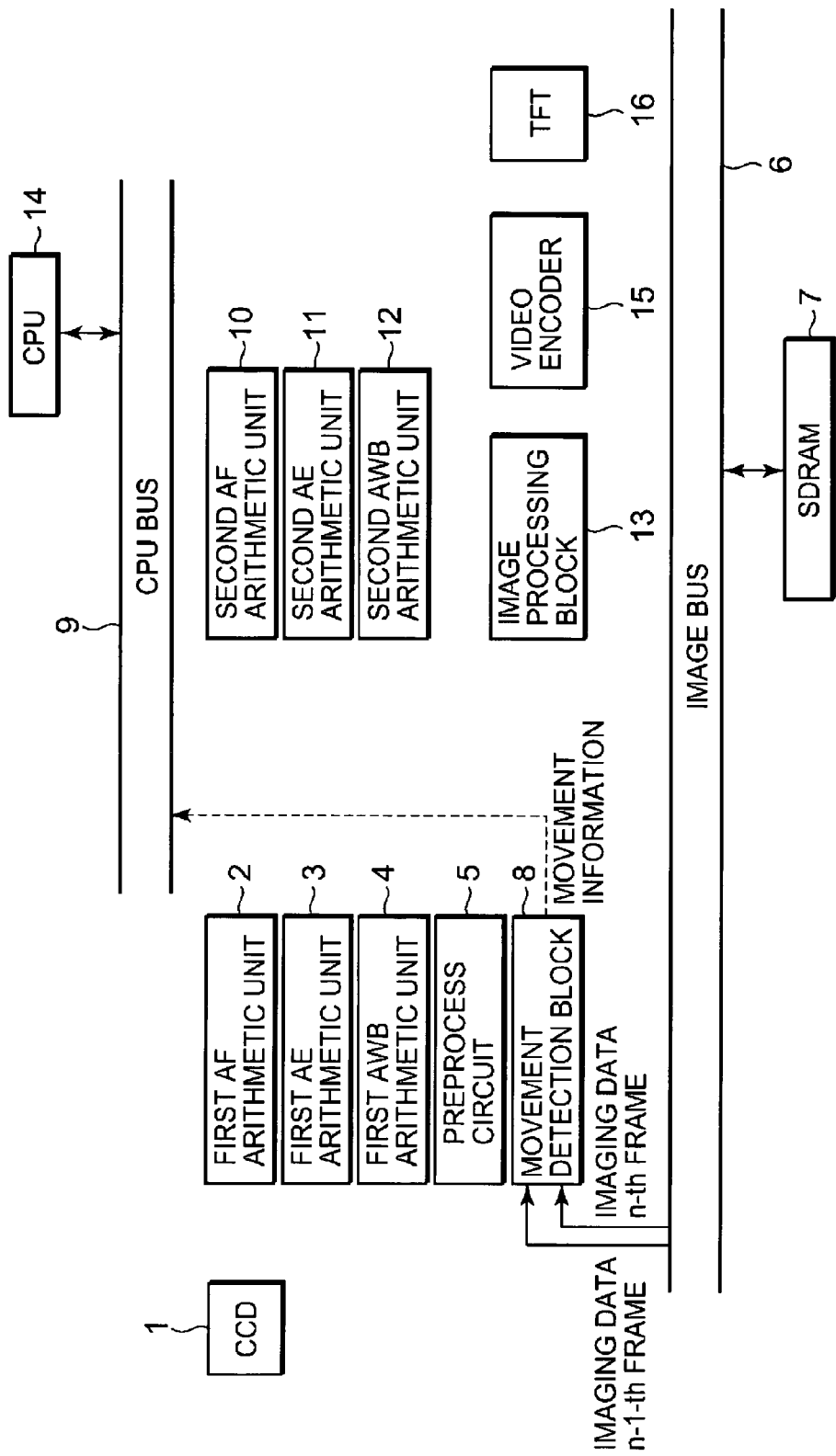
FIG. 3 is a second diagram showing a flow of the data in the electronic camera with the image processing device according to the embodiment of the present invention.

FIG. 3 shows a flow of data concerning detection of image movement (blurring). The movement detection block 8 detects movement of the image based on the imaging data stored in the SDRAM 7. Detected Movement information of the image is sent to the CPU bus 9. Here, the movement detection is performed by comparison of, for example, the imaging data (imaging data of an n–1-th frame) obtained at a previous imaging time with the imaging data (imaging data of an n-th frame) obtained at a present imaging time using a technology such as a block matching calculation. When such comparison is performed, the SDRAM 7 needs to have a capacity capable of storing the imaging data for at least two frames. It is to be noted that the movement of the image may also be detected by direct detection of shake of the electronic camera by use of a gyro sensor, an angular speed sensor or the like.

Figure 4:
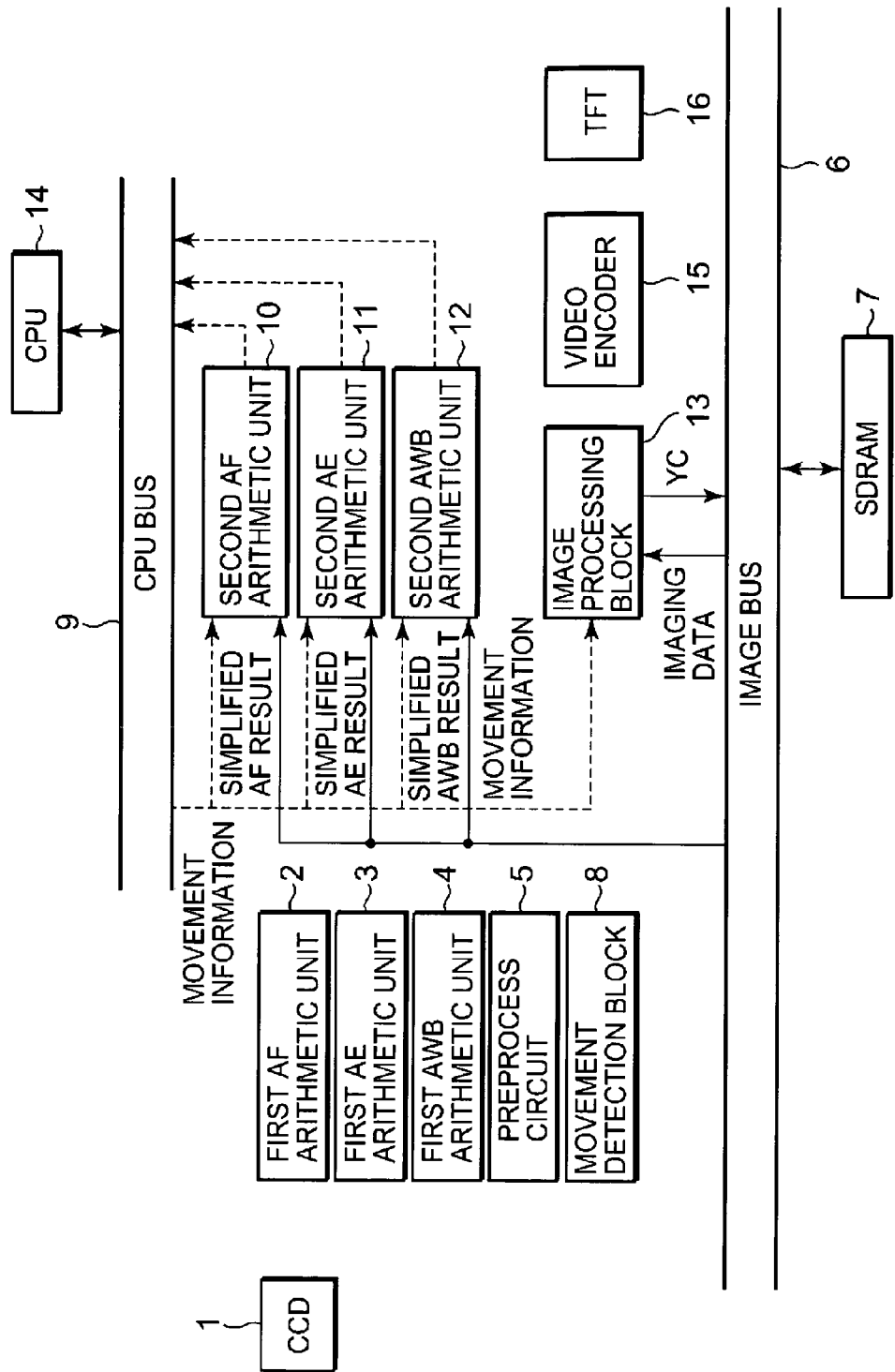
FIG. 4 is a third diagram showing a flow of the data in the electronic camera with the image processing device according to the embodiment of the present invention.

FIG. 4 shows a flow of the movement information sent to the CPU bus 9. As shown in FIG. 4, the movement information is sent to the second AF arithmetic unit 10, the second AE arithmetic unit 11, and the second AWB arithmetic unit 12 as final evaluation data conversion portions, and is also sent to the image processing block 13. The simplified evaluation data stored in the SDRAM 7 are sent to the second AF arithmetic unit 10, the second AE arithmetic unit 11, and the second AWB arithmetic unit 12, respectively.

The second AF arithmetic unit 10 cumulatively adds up the simplified AF evaluation data based on the input movement information to obtain final AF evaluation data. The second AE arithmetic unit 11 cumulatively adds up the simplified AE evaluation data based on the input movement information to obtain final AE evaluation data. The second AWB arithmetic unit 12 cumulatively adds up the simplified AWB evaluation data based on the input movement information to obtain final AWB evaluation data. The final evaluation data converted and obtained in the second AF arithmetic unit 10, the second AE arithmetic unit 11, and the second AWB arithmetic unit 12 are sent to the CPU 14 via the CPU bus 9. It is to be noted that the final evaluation data may also be written in the SDRAM.

The CPU 14 performs known focus detection processing, photometry processing, and white balance adjustment processing based on the final evaluation data input from the second AF arithmetic unit 10, the second AE arithmetic unit 11, and the second AWB arithmetic unit 12, respectively.

Figure 5:
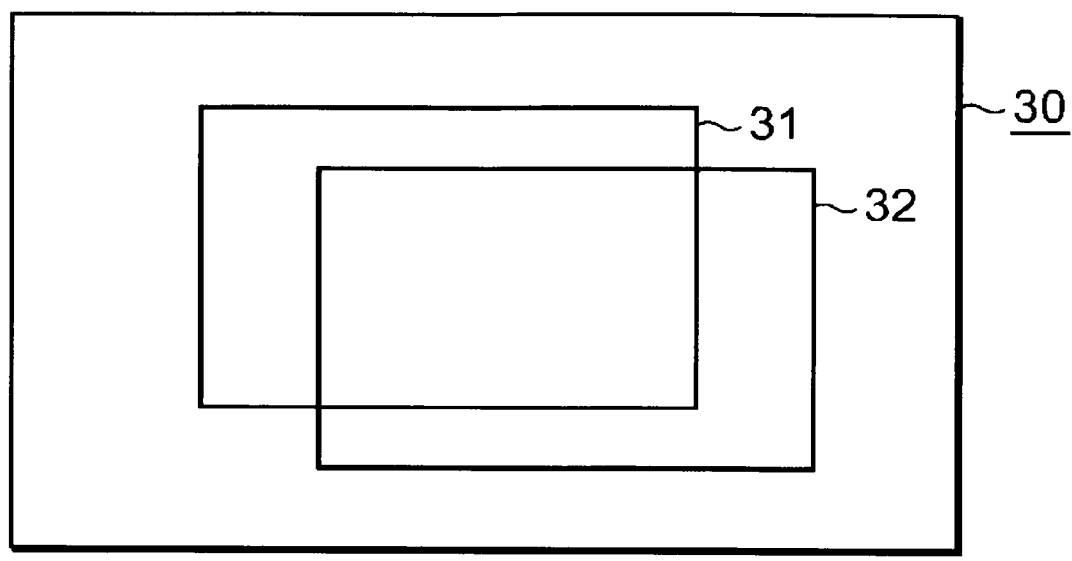
FIG. 5 is an explanatory view of electronic vibration correction.

Moreover, as shown in FIG. 5, the image processing block 13 reads the imaging data of, for example, an area 31 or an area 32 from imaging data 30 stored in the SDRAM 7 based on the movement information. Moreover, the image processing block 13 subjects the read image to known image processing such as gamma correction processing, color correction processing, and luminance color difference conversion processing. That is, since a reading position of the imaging data is controlled in consideration of a movement amount, an image can be obtained in a state in which vibrations have been corrected. It is to be noted that the above-described reading position control for the imaging data is performed by the CPU 14 as a reading control section.

Figure 6:
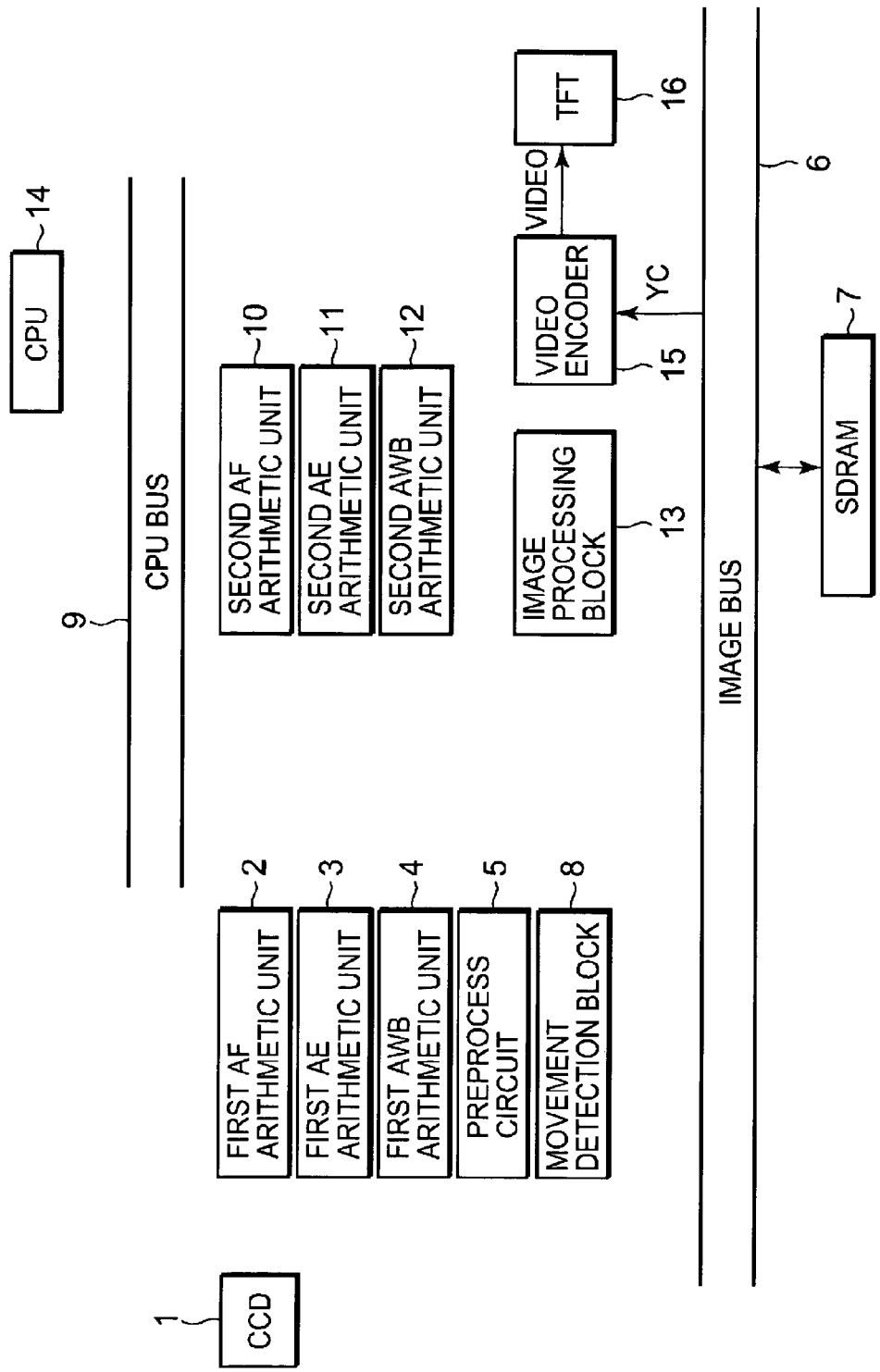
FIG. 6 is a fourth diagram showing a flow of the data in the electronic camera with the image processing device according to the embodiment of the present invention.

Luminance color difference data (YC data) obtained in the image processing block 13 are stored again in the SDRAM 7 via the image bus 6. Thereafter, the YC data stored in the SDRAM 7 is sent to the video encoder 15 as shown in FIG. 6. The video encoder 15 converts the YC data into a video signal such as NTSC, and the image is displayed in the TFT display unit 16 based on this video signal.

Next, AF, AE, AWB procedures in the present embodiment will be described in more detail.

Figure 7:
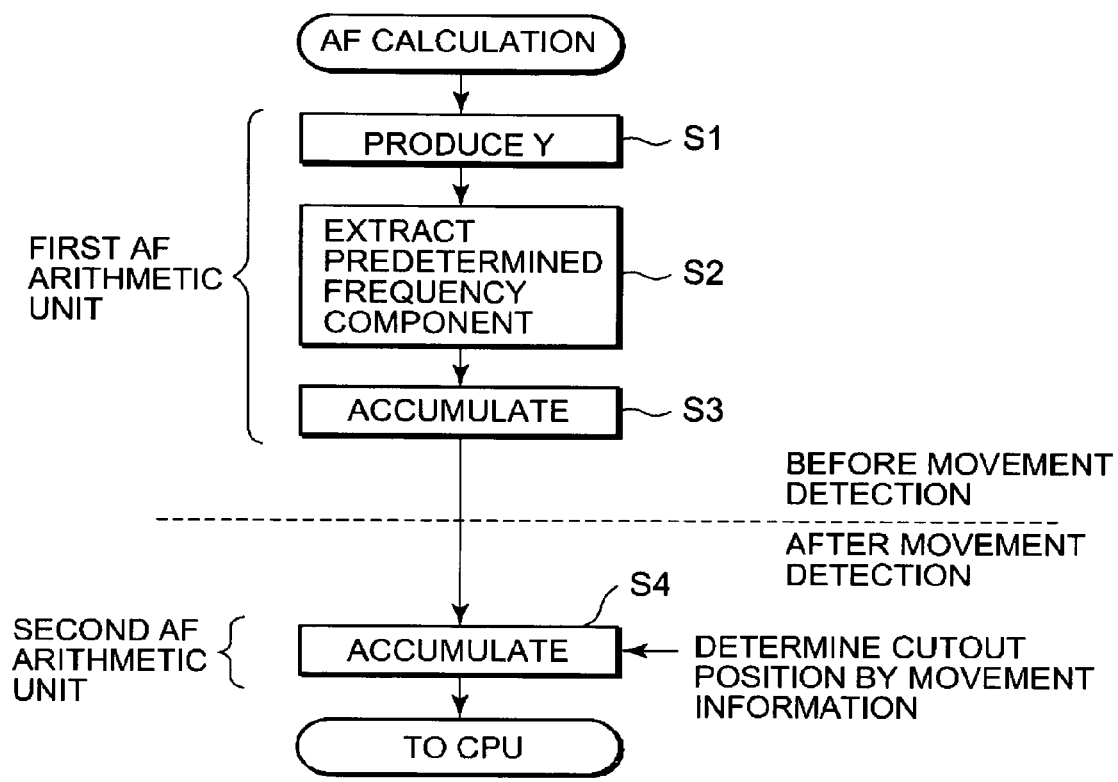
FIG. 7 is a flowchart showing processing at an AF calculation time in the electronic camera with the image processing device according to the embodiment of the present invention.

First, the AF will be described. FIG. 7 is a flowchart showing a procedure of an AF evaluation data calculating operation according to the present embodiment.

When the imaging data is input into the first AF arithmetic unit 2, the first AF arithmetic unit 2 produces Y data from the input imaging data (step S1). For example, the Y data are obtained by YC separation of the imaging data. Next, a predetermined frequency component is extracted from the Y data obtained in the step S1 using a low pass filter and a high pass filter (step S2). Next, the Y data are cumulatively added up to a predetermined data size to produce the simplified AF evaluation data, and the produced simplified AF evaluation data is stored in the SDRAM 7 (step S3). These processes are performed in parallel with the detection of the movement of the image.

After the completion of the detection of the movement of the image, the second AF arithmetic unit 10 reads the simplified AF evaluation data from the SDRAM 7, and cumulatively adds up the read simplified AF evaluation data to obtain the final AF evaluation data (step S4). Here, to obtain the final AF evaluation data, reading is controlled in such a manner as to cut out data of a predetermined area of the simplified AF evaluation data in accordance with the movement information of the image, and the only data in the area are cumulatively added up. It is to be noted that the above-described reading position control of the imaging data is executed by the CPU 14.

Figure 8:
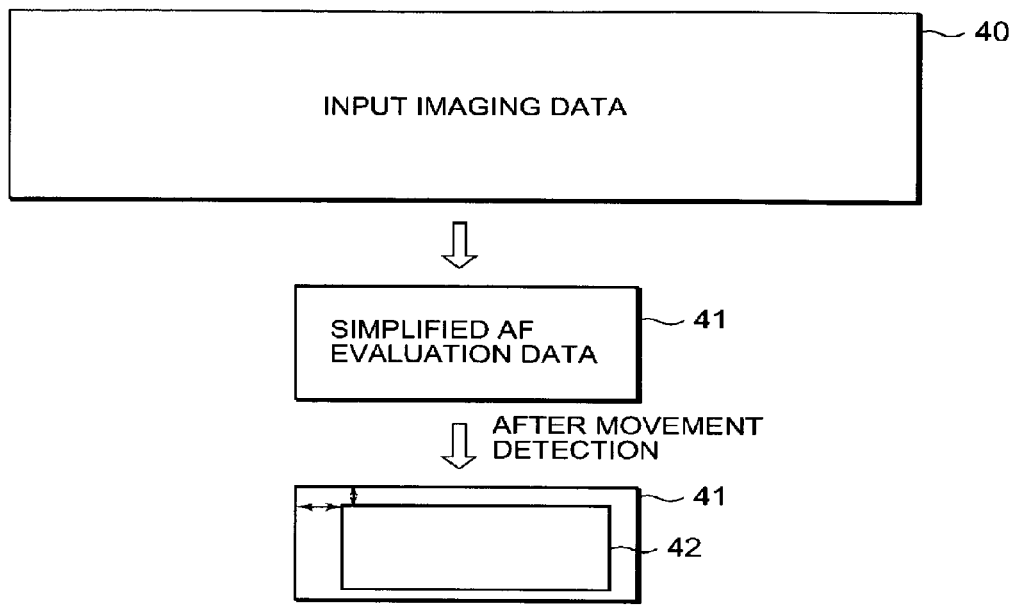
FIG. 8 is a concept diagram of cumulative addition processing at an AF time.

As shown in FIG. 8, in the AF of the present embodiment, simplified AF evaluation data 41 is obtained in parallel with the image movement detection. After the image movement detection, the simplified AF evaluation data 41 is further cumulatively added up to obtain final AF evaluation data 42. According to the present embodiment, it is possible to obtain the simplified AF evaluation data 41 having an intermediate data size between sizes of imaging data 40 and the final AF evaluation data 42 in parallel with the detection of the movement of the image. Accordingly, after the detection of the movement of the image, the remaining process is only to obtain the final AF evaluation data 42 from the simplified AF evaluation data 41. Therefore, after the movement of the image is detected, processing such as extraction of the Y data is not required. Moreover, since a processing amount of the cumulative addition is also decreased, a time required for the AF can be shortened.

Figure 9:
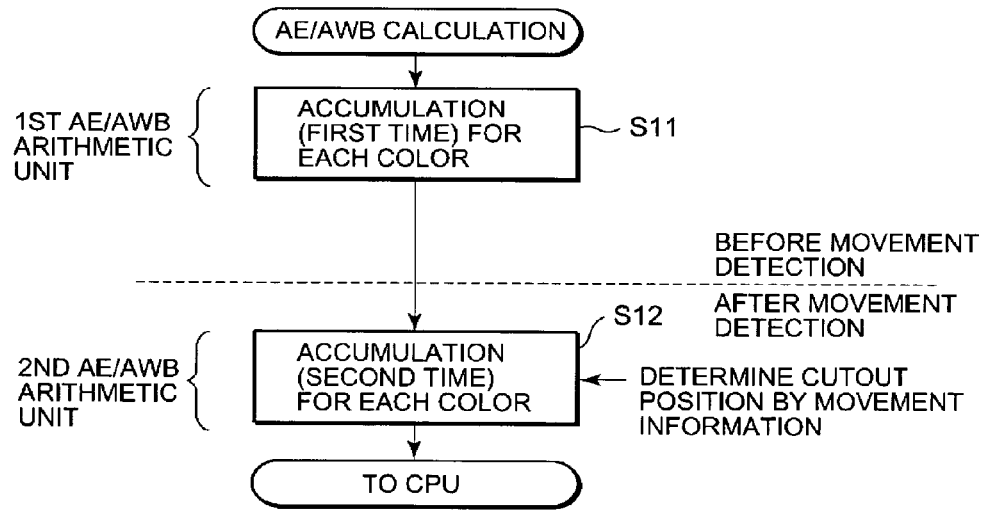
FIG. 9 is a flowchart showing processing at an AE/AWB calculation time in the electronic camera with the image processing device according to the embodiment of the present invention.

FIG. 9 is a flowchart showing a procedure of a calculating operation of the AE and AWB evaluation data according to the present embodiment. Here, the AE evaluation data calculating operation and the AWB evaluation data calculating operation are performed in the same processes. Therefore, only the calculation of the AE evaluation data will be described here.

When the imaging data is input into the first AE arithmetic unit 3, the first AE arithmetic unit 3 accumulates the input imaging data for each color component to produce the simplified AE evaluation data (step S11). This processing is performed in the first AE arithmetic unit 3 in parallel with the detection of the movement of the image.

After the completion of the detection of the movement of the image, the second AE arithmetic unit 11 reads the simplified AE evaluation data from the SDRAM 7, and cumulatively adds up the read simplified AE evaluation data for each color component to obtain the final AE evaluation data (step S12). To obtain this final AE evaluation data, the reading is controlled in such a manner as to cut out the data of the predetermined area of the simplified AF evaluation data 41 in accordance with the image movement information, and the only data in the area is cumulatively added up. Here, the data size at a time of the calculation of the final evaluation data differs with the AE and the AWB.

According to such a method and configuration, a processing time after the detecting of the movement of the image can be shortened with respect to the AE or the AWB in the same manner as in the AF.

Figure 10:
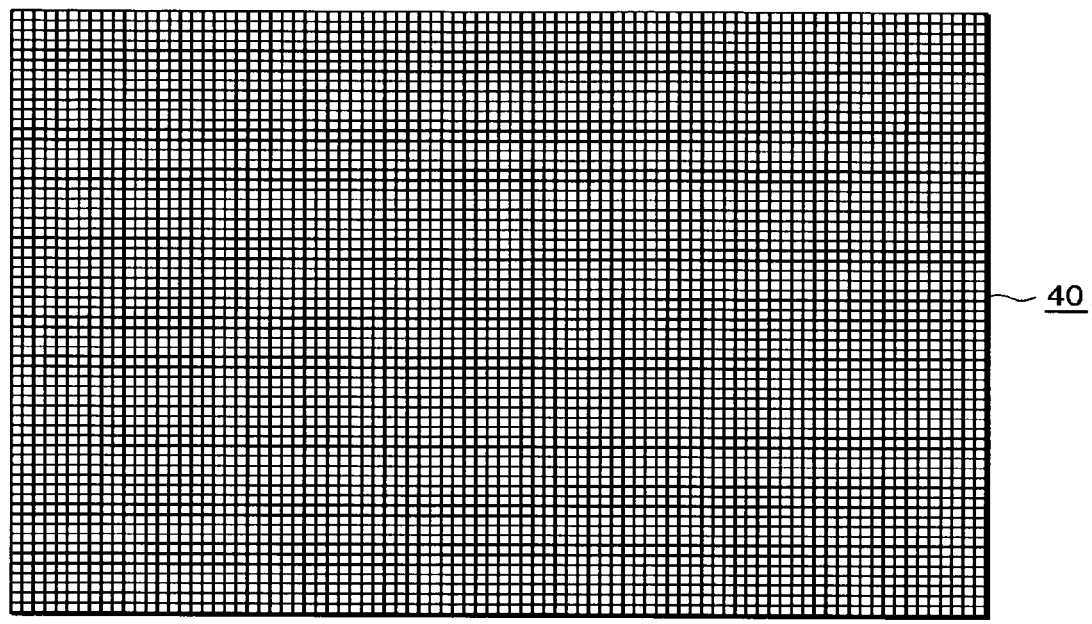
FIG. 10 is a first diagram showing the cumulative addition processing in detail.
Figure 11:
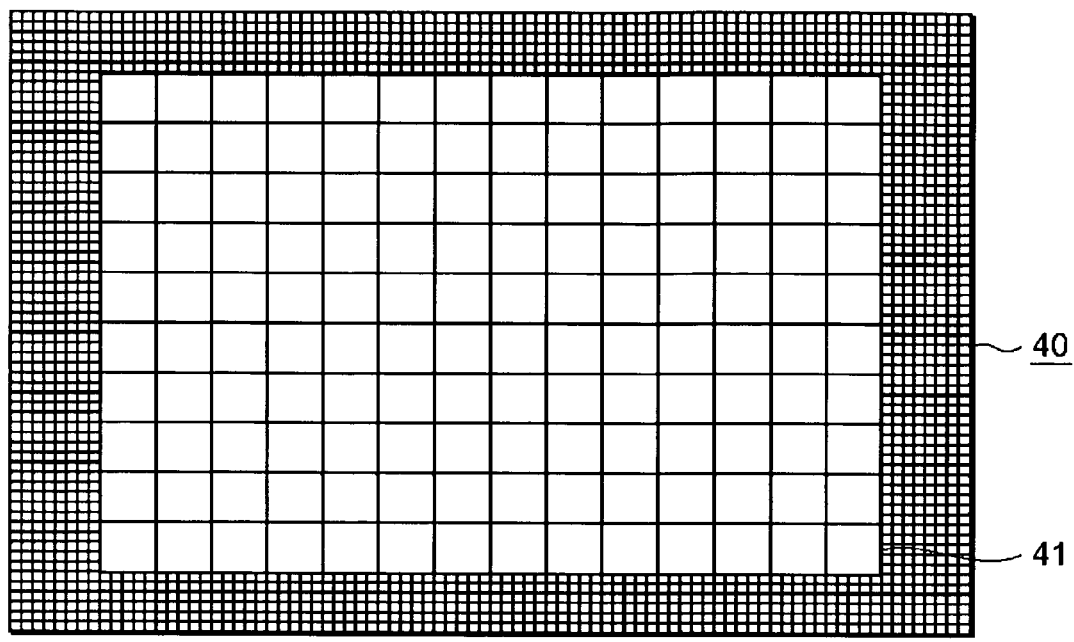
FIG. 11 is a second diagram showing the cumulative addition processing in detail.

A cumulative adding operation performed in the present embodiment will be described in more detail. In the CCD 1, a partial area is read from the imaging data 40 shown in FIG. 10, and the imaging data included in this partial area are cumulatively added up every predetermined number of data, and integrated into one data to obtain the simplified evaluation data 41 shown in FIG. 11. The simplified evaluation data 41 is stored in the SDRAM 7. It is to be noted that in FIG. 11, for example, 5×5 data are cumulatively added up into one data. However, this data number is merely one example, and can be changed.

Moreover, in the AF, the predetermined number of simply adjacent data may be cumulatively added up, but the cumulative addition is performed for each color in the AE or the AWB. For example, when a pixel arrangement of the imaging element is [RGB] Bayer arrangement, the cumulative addition is performed for each color of R, Gr, Gb, and B.

In a second AF, the second AF arithmetic unit 10 determines an area to be cut out from the simplified evaluation data 41 based on the image movement detected with the movement detection block 8, and further accumulates the data of the determined cutout area every predetermined number of data to obtain the final evaluation data 42. It is to be noted that in FIG. 12, for example, 3×3 data are cumulatively added up into one data in the simplified evaluation data 41.

FIG. 13A shows a timing chart in conventional AF and AE processing, and FIG. 13B shows a timing chart in AF and AE processing according to the present embodiment. It is to be noted that since AWB processing is similar to the AE processing, drawing thereof is omitted. As shown in FIGS. 13A and 13B, in a case where the final evaluation data is obtained from the simplified evaluation data, a data processing amount after the detection of the movement of the image is smaller than that in a case where the final evaluation data is obtained directly from the imaging data. Therefore, a time required for the AF or AE processing can be reduced as a whole.

The present invention has been described above based on the embodiment, but the present invention is not limited to the above-described embodiment, and the present invention can be variously modified or applied within the scope of the present invention.

Figure 12:
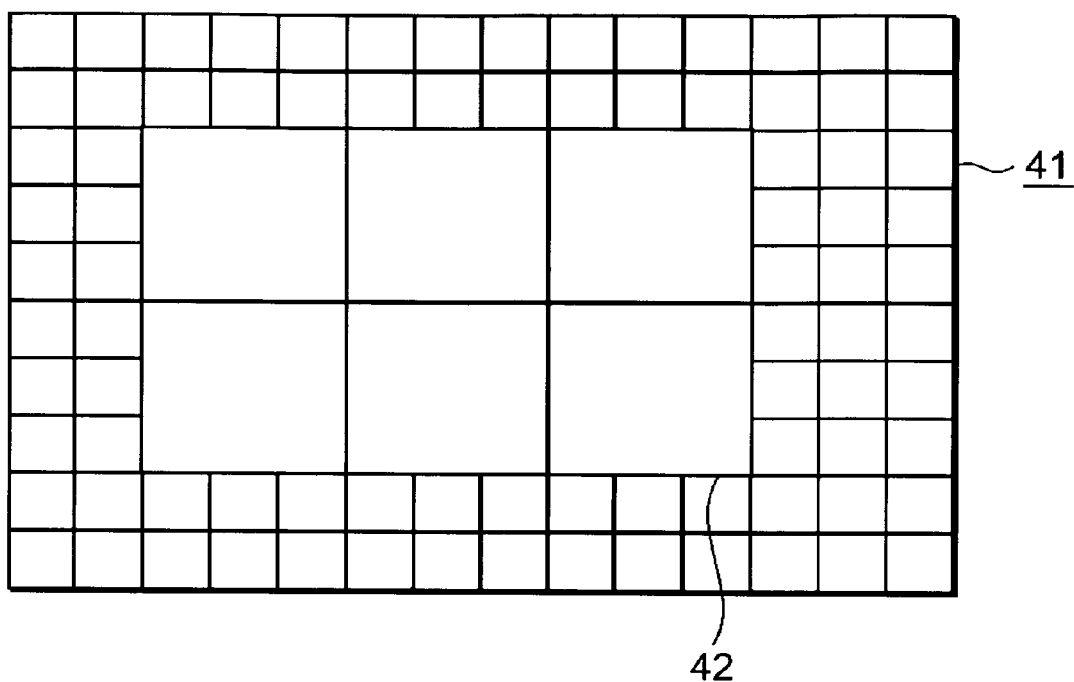
FIG. 12 is a third diagram showing the cumulative addition processing in detail.
Figure 14:
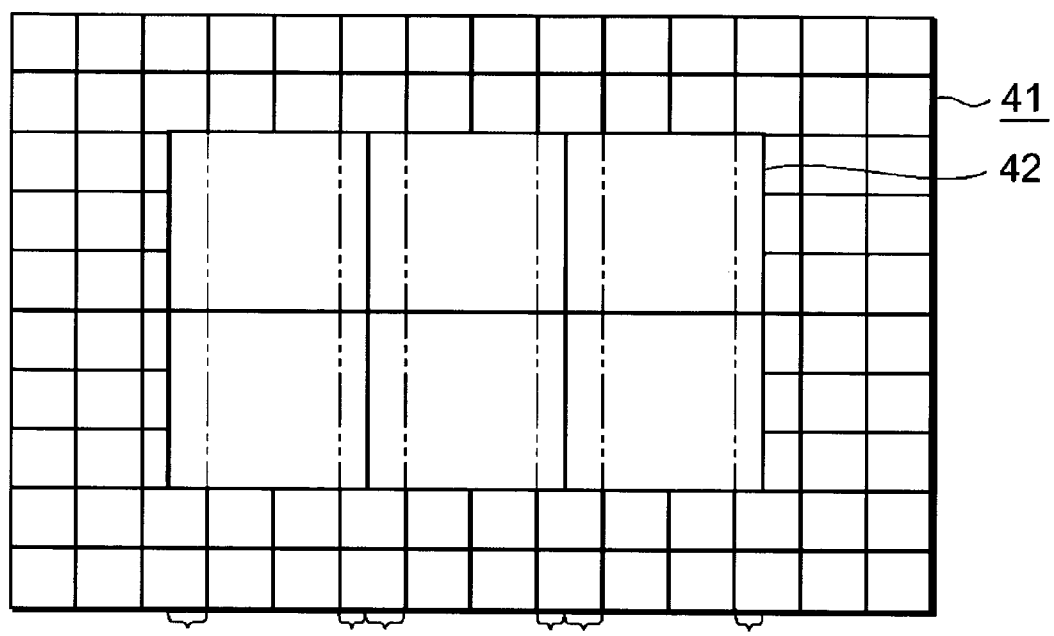
FIG. 14 is an explanatory view showing a modification of the embodiment of the present invention.
Figure 15A:
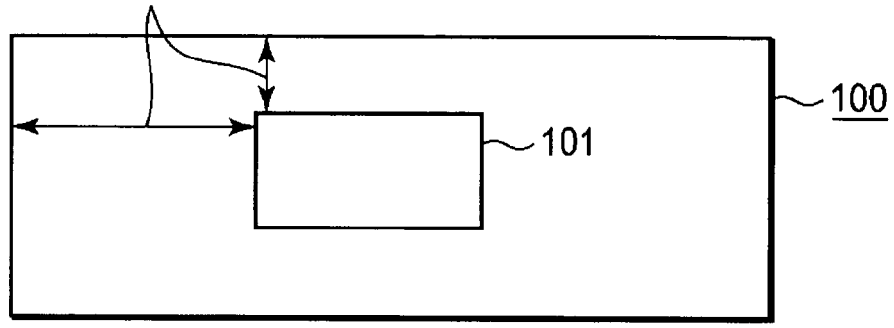
FIGS. 15A to 15C are first diagrams showing the AF calculation according to a conventional example.
Figure 15B:
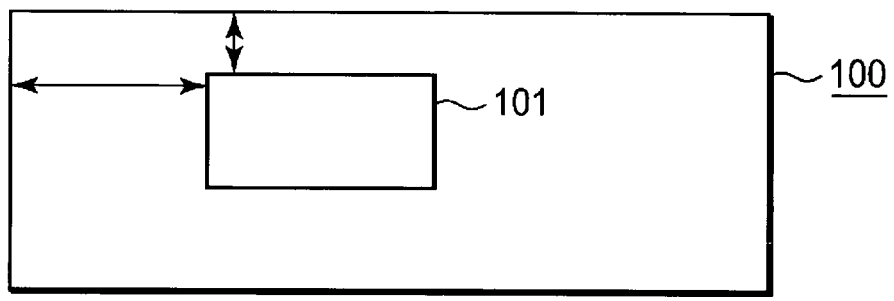
Figure 15C:
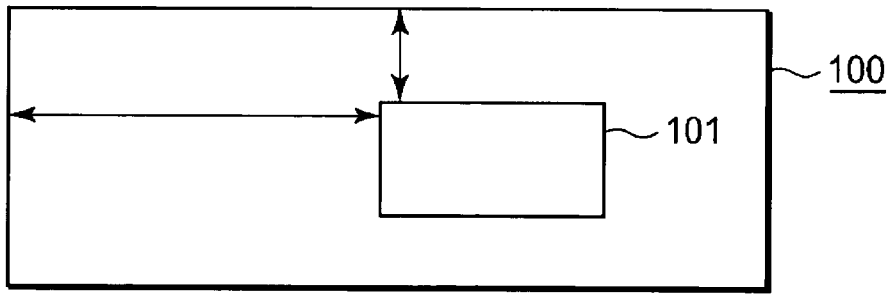
Figure 16A:
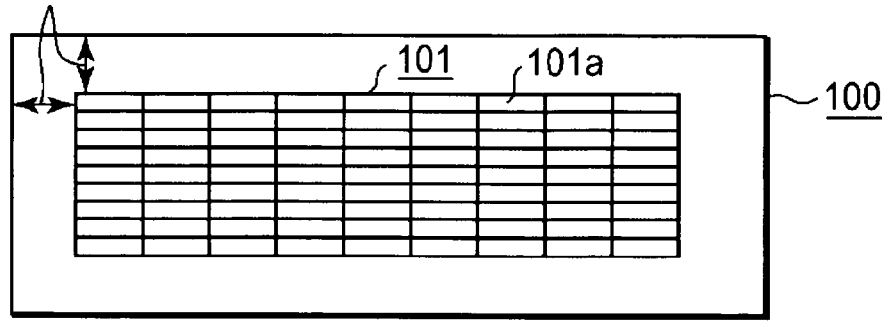
FIGS. 16A to 16C are second diagrams showing the AF calculation according to the conventional example.
Figure 16B:
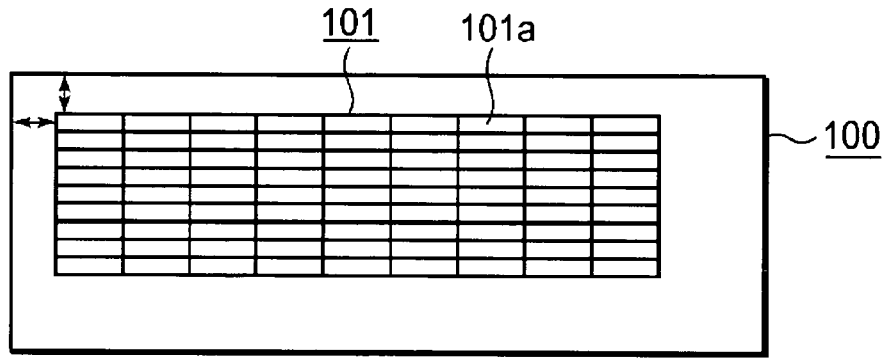
Figure 16C:
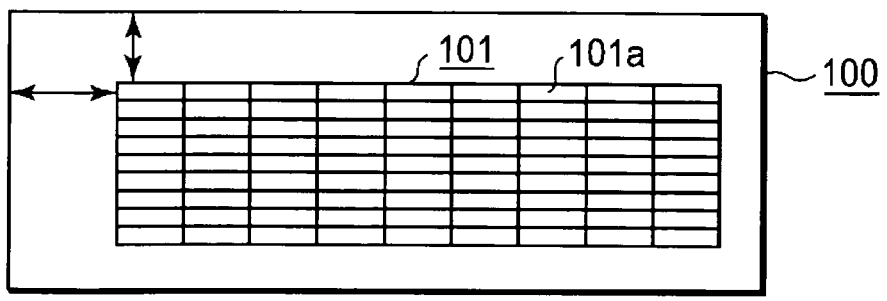

For example, in the example of FIG. 12, the cutout area of the data after the movement detection can be changed only every data unit of the simplified evaluation data. However, since the movement information of the image is calculated with respect to original imaging data, not the simplified evaluation data, when the image is cut out from the simplified evaluation data, the image is sometimes considered to deviate from one data size of the simplified evaluation data. In this case, a portion which has deviated from the data size of the simplified evaluation data is obtained as the area 42 by interpolation, the reading is controlled in such a manner as to cut out the data from the area, and the data may be converted into the final evaluation data. According to this method, more accurate movement information can be reflected at a second cumulative addition time.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An image processing device comprising:
   a detection unit for detecting blurring of an image picked up with an imaging element;
   a simplified calculation unit for calculating an intermediate value of evaluation data of the picked-up image in parallel with a detecting operation of the detection unit;
   a memory for memorizing a calculation result of the simplified calculation unit; and
   a final calculation unit for calculating a final value of the evaluation data from the intermediate value of the evaluation data memorized in the memory based on the blurring detected with the detection unit after completion of the detection with the detection unit.

2. The image processing device according to claim 1, wherein the final calculation unit has a function of determining an area to be cut out from the image based on the blurring detected with the detection unit, and the calculation object of the final calculation unit is confined within the cutout area.

3. The image processing device according to claim 2, wherein the final calculation unit accumulates the intermediate values of the evaluation data in the cutout areas in a plurality of images to calculate the final value of the evaluation data.

4. The image processing device according to claim 3, wherein the final calculation unit performs a calculation where amount of data is reduced by integrating the predetermined number of data into one.

5. The image processing device according to claim 1, wherein the calculation object of the simplified calculation unit is confined within a part of the image picked up with the imaging element.

6. The image processing device according to claim 1, wherein the final calculation unit has a function of determining as an area to be cut out from the image, which area is included in and smaller than the calculation object area of the simplified calculation unit based on the blurring detected by the detection unit, and the calculation object of the final calculation area is confined within the cutout area.

7. The image processing device according to claim 1, wherein the simplified calculation unit performs a calculation to reduce amount of data by integrating a predetermined number of data into one data.

8. The image processing device according to claim 1, wherein the evaluation data is data to be used in at least one of an AF control, an AE control, and an AWB control of the image.

9. An image processing device comprising:
   an input section for inputting imaging data obtained by imaging;
   a simplified evaluation data converting section for converting the imaging data input with the input section into simplified evaluation data;
   a storage section for storing the simplified evaluation data converted with the simplified evaluation data converting section;
   a movement detecting section for detecting movement of an image from the imaging data input with the input section at a previous imaging time and the imaging data input with the input section at a present imaging time; and
   a final evaluation data converting section for converting the simplified evaluation data stored in the storage section into final evaluation data in accordance with the image movement detected with the movement detecting section.

10. The image processing device according to claim 9, further comprising:

a reading control section for controlling reading of the simplified evaluation data stored in the storage section based on the image movement detected with the movement detecting section.

11. The image processing device according to claim 9, wherein the simplified evaluation data obtained with the simplified evaluation data converting section are at least one of evaluation data of focus detection, photometry, and white balance adjustment.

12. The image processing device according to claim 11, wherein the imaging data are data including luminance information, and the evaluation data of the focus detection is evaluation data obtained by cumulative addition of a part of the luminance information.

13. The image processing device according to claim 11, wherein the imaging data is data including a plurality of pieces of color information, and the evaluation data of the photometry and the evaluation data of the white balance adjustment are evaluation data obtained by cumulative addition of a part of the imaging data for each color.

14. The image processing device according to claim 9, wherein the final evaluation data are evaluation data obtained by cumulative addition of a part of the simplified evaluation data.

15. The image processing device according to claim 9, wherein the final evaluation data converting section converts the simplified evaluation data of a position interpolated with respect to the data size of the simplified evaluation data into the final evaluation data based on the image movement detected with the movement detecting section.

16. The image processing device according to claim 9, wherein the detection of the image movement by the movement detecting section is performed in parallel with the conversion into the simplified evaluation data by the simplified evaluation data converting section.

17. The image processing device according to claim 9, wherein at least the input section, the simplified evaluation data converting section, the storage section, the movement detecting section, and the final evaluation data converting section are formed on the same chip.

18. An electronic camera comprising:

an imaging section for picking up an image of a subject to acquire imaging data;

a simplified evaluation data converting section for converting the imaging data acquired with the imaging section into simplified evaluation data;

a storage section for storing the simplified evaluation data converted with the simplified evaluation data converting section;

a camera shake detecting section for detecting camera shake of the electronic camera from the imaging data acquired with the imaging section at a previous imaging time and the imaging data acquired by the imaging section at a present imaging time; and a final evaluation data converting section for converting the simplified evaluation data stored in the storage section into final evaluation data in accordance with the camera shake of the electronic camera detected with the camera shake detecting section.

* * * * *